(12) United States Patent
Winters et al.

(10) Patent No.: US 9,964,637 B1
(45) Date of Patent: May 8, 2018

(54) SYSTEM AND METHOD FOR OPERATING PASSIVE RADAR

(71) Applicant: Lockheed Martin Corporation, Bethesda, MD (US)

(72) Inventors: Jack H. Winters, Middletown, NJ (US); Donna F. Smith, Cherry Hill, NJ (US); Michael J. Luddy, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 425 days.

(21) Appl. No.: 14/689,511

(22) Filed: Apr. 17, 2015

(51) Int. Cl.
*G01S 13/66* (2006.01)
*H01Q 3/24* (2006.01)
*G01S 13/00* (2006.01)
*G01S 13/02* (2006.01)

(52) U.S. Cl.
CPC ............ *G01S 13/66* (2013.01); *G01S 13/003* (2013.01); *H01Q 3/24* (2013.01); *G01S 2013/0263* (2013.01)

(58) Field of Classification Search
CPC ................ G01S 13/66; G01S 13/003; G01S 2013/0263; G01S 7/4004; H01Q 3/24
See application file for complete search history.

(56) References Cited

U.S. PATENT DOCUMENTS

| | | | | |
|---|---|---|---|---|
| 3,795,911 A | * | 3/1974 | Hammack | G01S 13/66 342/106 |
| 3,953,856 A | * | 4/1976 | Hammack | G01S 13/66 342/125 |
| 5,481,570 A | | 1/1996 | Winters | |
| 6,225,942 B1 | * | 5/2001 | Alon | G01S 7/4004 342/59 |
| 6,744,781 B2 | | 6/2004 | Luddy | |
| 7,183,969 B2 | * | 2/2007 | Pozgay | G01S 7/4004 342/145 |
| 7,358,892 B2 | * | 4/2008 | Thome | G01S 13/003 342/165 |
| 8,036,164 B1 | | 10/2011 | Winters et al. | |

FOREIGN PATENT DOCUMENTS

| | | | |
|---|---|---|---|
| FR | 2801109 A1 * | 5/2001 | ........... G01S 13/003 |
| FR | 2914431 A1 * | 10/2008 | ........... G01S 13/003 |

* cited by examiner

*Primary Examiner* — Bernarr E Gregory
(74) *Attorney, Agent, or Firm* — Howard IP Law Group

(57) ABSTRACT

A method for tracking an object of interest with a passive radar system using multiple radar sensors. The method includes the steps of receiving, with at least one controller, radar sensor characteristics and radar sensor locations data for a plurality of radar receivers occupying an area of interest. Data indicative of direct or reflected radar return signals from emitters of opportunity received by the plurality of radar receivers is also received at the controller. From this data, objects of interest are identified. The controller is configured to calculate optimized radar sensor parameters for the plurality of radar receivers for each identified object of interest, and transmit the same to the plurality of radar receivers for implementation. Radar return data received by the plurality of radar receivers using the optimized sensor parameters is provided to the central controller, and updated optimized sensor parameters according to the updated received radar return data are calculated.

16 Claims, 4 Drawing Sheets

SYSTEM AND METHOD FOR OPERATING PASSIVE RADAR

FIELD OF THE INVENTION

The present invention relates to radar systems and, more specifically, to systems and methods for improving the tracking of objects of interest using a passive radar system.

BACKGROUND

Radar systems are useful for detecting, characterizing, and monitoring various kinematic parameters associated with natural and/or man-made objects and are critical to both civilian and military operations. Active radar systems typically transmit "beams" or electromagnetic (EM) signals intended to engage one or more objects or targets, and process reflected return signals (or echoes) for measuring spatial features, as well as for performing object identification, characterization, and tracking operations. Likewise, passive radar systems may perform similar identification and tracking functions. Their receivers rely on the reflection of EM emissions originating from existing sources, or "emitters of opportunity". For example, the wide-spread use of TV and radio antennas, cellular phone towers and the like provide an abundant source of EM emitter signals that can be used to aid in the detection and tracking of targets (e.g., airborne targets).

Current passive radar systems generally utilize only a single emitter of opportunity and a single sensor (i.e., a single radar receiver) for tracking targets. The use of all available emitters of opportunity, in conjunction with multiple sensors or receivers, has the potential to provide substantial improvement in tracking performance, particularly when sensors include adaptive antenna arrays. This type of implementation, however, can lead to prohibitively complex systems.

Accordingly, improved systems and methods for tracking objects of interest using a passive radar system are desired.

SUMMARY

In one embodiment of the present disclosure, a method for tracking an object of interest with a passive radar system using multiple radar sensors is provided. The method includes the steps of receiving, at a central controller, radar sensor characteristics and radar sensor locations data for a plurality of radar receivers occupying an area of interest. Data indicative of direct or indirect radar return signals received by the plurality of radar receivers is also received at the central controller. From this data, objects of interest are identified. A tracking list of identified objects may also be generated. The central controller is configured to calculate optimized radar sensor parameters for the plurality of radar receivers for each identified object of interest, and transmit the same to the plurality of radar receivers for implementation. Radar return data received by the plurality of radar receivers using the optimized sensor parameters is provided to the central controller, and updated optimized sensor parameters according to the updated received radar return data are calculated.

DETAILED DESCRIPTION

Figure 1:
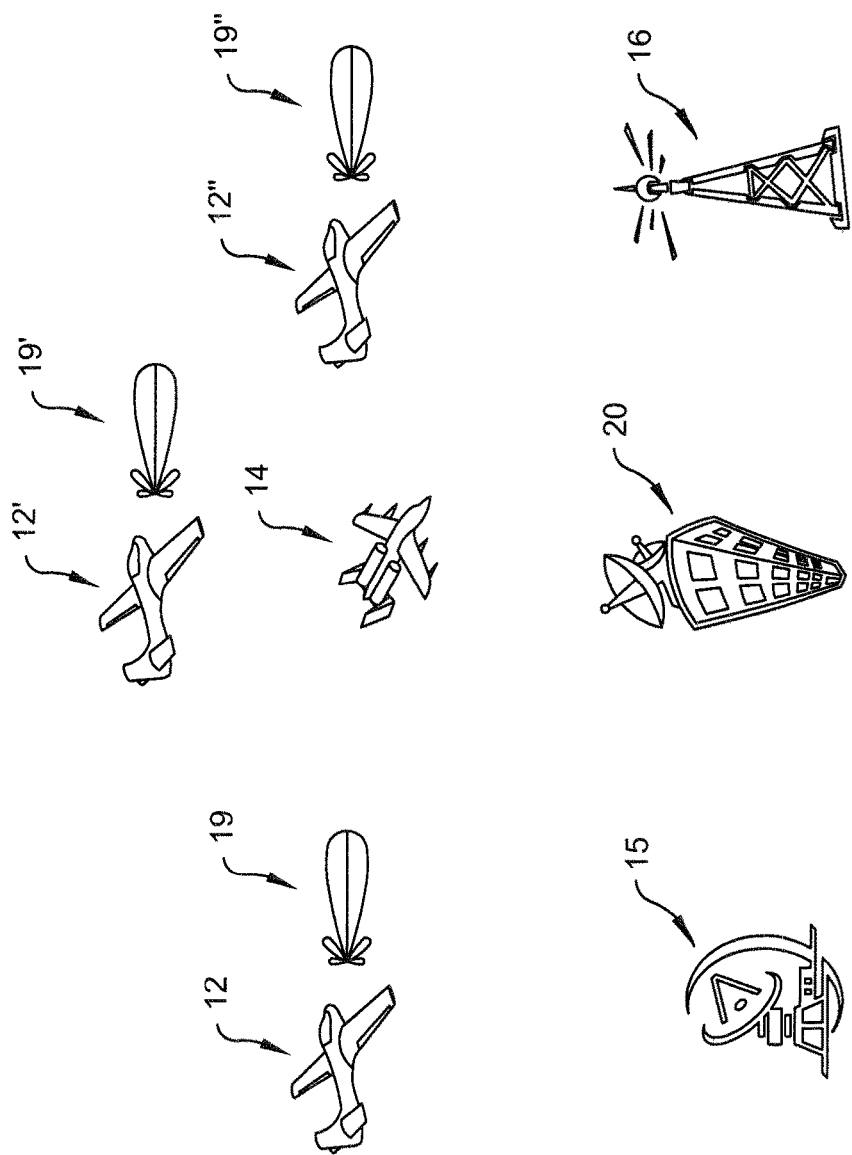
FIG. 1 is a simplified diagram illustrating a passive radar system according to an embodiment of the present disclosure.

It is to be understood that the figures and descriptions of the present invention have been simplified to illustrate elements that are relevant for a clear understanding of the present invention, while eliminating, for purposes of clarity, many other elements found in typical radar systems, including passive radar systems using adaptive antenna arrays. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

According to embodiments of the present disclosure, systems and methods for tracking objects of interest with a passive radar system using multiple radar sensors are provided. In one embodiment, a method includes the steps of receiving, at a least one controller, radar sensor characteristics and radar sensor locations data for a plurality radar receivers occupying an area of interest. The sensors receive both the direct and indirect (e.g., reflected) signals from a plurality of emitters of opportunity using adaptive antenna arrays, which consist of a plurality of reconfigurable antenna elements. The adaptive arrays adjust their beampattern to optimize reception, e.g., to maximize signal-to-noise ratio or signal-to-interference-plus-noise ratio for at least one of the emitters of opportunity. The adaptive arrays may also adjust their beampatterns based on control signals sent from the controller.

The radar sensors can search for emitters and signals of interest after the signals have been received by the plurality of antenna elements, using digital signal processing on the wideband received signals at each antenna element. This search can be conducted by techniques such as compressed sensing for sparse (in frequency) emitters of opportunity, or under direction of the controller. The radar sensors may process received signals and transmit information indicative thereof, which can include angle-of-arrival information and raw measurements of the phase and amplitude of the signals at each antenna element, to the controller. The controller may combine signals received from multiple radar sensors, such as using network MIMO techniques. From this data, objects of interest are identified.

The controller is further configured to calculate optimized radar sensor parameters for the plurality of radar receivers for each identified object of interest, and to transmit the same to the plurality of radar receivers for implementation. Radar return data received by the plurality of radar sensors using the optimized sensor parameters is provided to the controller, and updated optimized sensor parameters according to the updated received radar return data are calculated. These updated sensor parameters include beampatterns at different frequencies at each sensor. This process is repeated to track the targets of interest with the required performance metrics.

Accordingly, embodiments of the present disclosure include systems and methods for implementing a passive radar system utilizing multiple radar sensors and multiple emitters of opportunity for optimizing system performance. These embodiments include tracking algorithms that iteratively adjust a receive beampattern of an adaptive radar antenna array, and selectively add and remove radar signals received from known emitters of opportunity from consideration to increase tracking performance. These optimizing techniques can employ the greedy algorithm, whereby received signals from various emitters may be added sequentially, for example, in an order dictated by an estimated largest increase in tracking accuracy. See, e.g., "Implementation of greedy algorithms for LTE sparse channel estimation," Maechler, P.; Greisen, P.; Sporrer, B.; Steiner, S.; Felber, N.; Burg, A., 2010 Conference Record of the Forty Fourth Asilomar Conference on *Signals, Systems and Computers* (*ASILOMAR*), 7-10 Nov. 2010. As signals are added, adaptation of the antenna array beampatterns of each receiver is performed, including the coherent combination of the signals received from the same emitter.

In one exemplary scenario, one or more emitters of opportunity may be recognized as having comparatively large transmitting power but may lack range resolution, while other emitters may comprise lower transmitting power but have higher range resolutions. Using this known information, the strongest received signal from the closest radar sensor may be used to determine an approximate range and angular arc for a given target (i.e., the spatial volume occupied by the target). A process according to embodiments of the disclosure may be configured to sequentially add additional emitted signals received by the radar sensor which increase the accuracy the greatest amount. This may include, for example, the emitted signal that is the most orthogonal to the previously-determined ballistic path.

At each iteration, the beamwidth of the receiving sensors' antenna arrays may be decreased in order to match the increased tracking accuracy (i.e., focus the receive beam only on the improved estimated target location). This process may be continued until an estimated accuracy is high enough to coherently add signals from the same emitters of opportunity together in order to improve system accuracy. Moreover, this process may be continuously updating, adding, and removing radar sensors and received signals, as well as adapting beampatterns, to optimize tracking accuracy.

FIG. 1 illustrates exemplary target tracking scenario in which passive radar techniques according to embodiments of the present disclosure will be described. A plurality of receivers, for example, on-board passive radar systems of unmanned aerial vehicles (UAVs) 12,12',12", are shown. Each radar system may include at least one adaptive radar antenna array for selectively generating respective beampatterns 19,19',19". As described above, passive radar systems rely on EM signals generated by emitters of opportunity or transmitting antennas, for example, FM radio antennas.

As illustrated, exemplary transmitting antennas 15,16, or emitters of opportunity, are in the vicinity of a target 14. Transmitted signals may be reflected by a target 14, and detected or received by respective radar antennas of UAVs 12,12',12" in a conventional way. A centralized control system, embodied as control station 20, may be in communication with UAVs 12,12',12" and configured to obtain radar data received thereby for performing optimizing techniques according to embodiments of the present disclosure in order to improve target identification and tracking operations.

Figure 2:
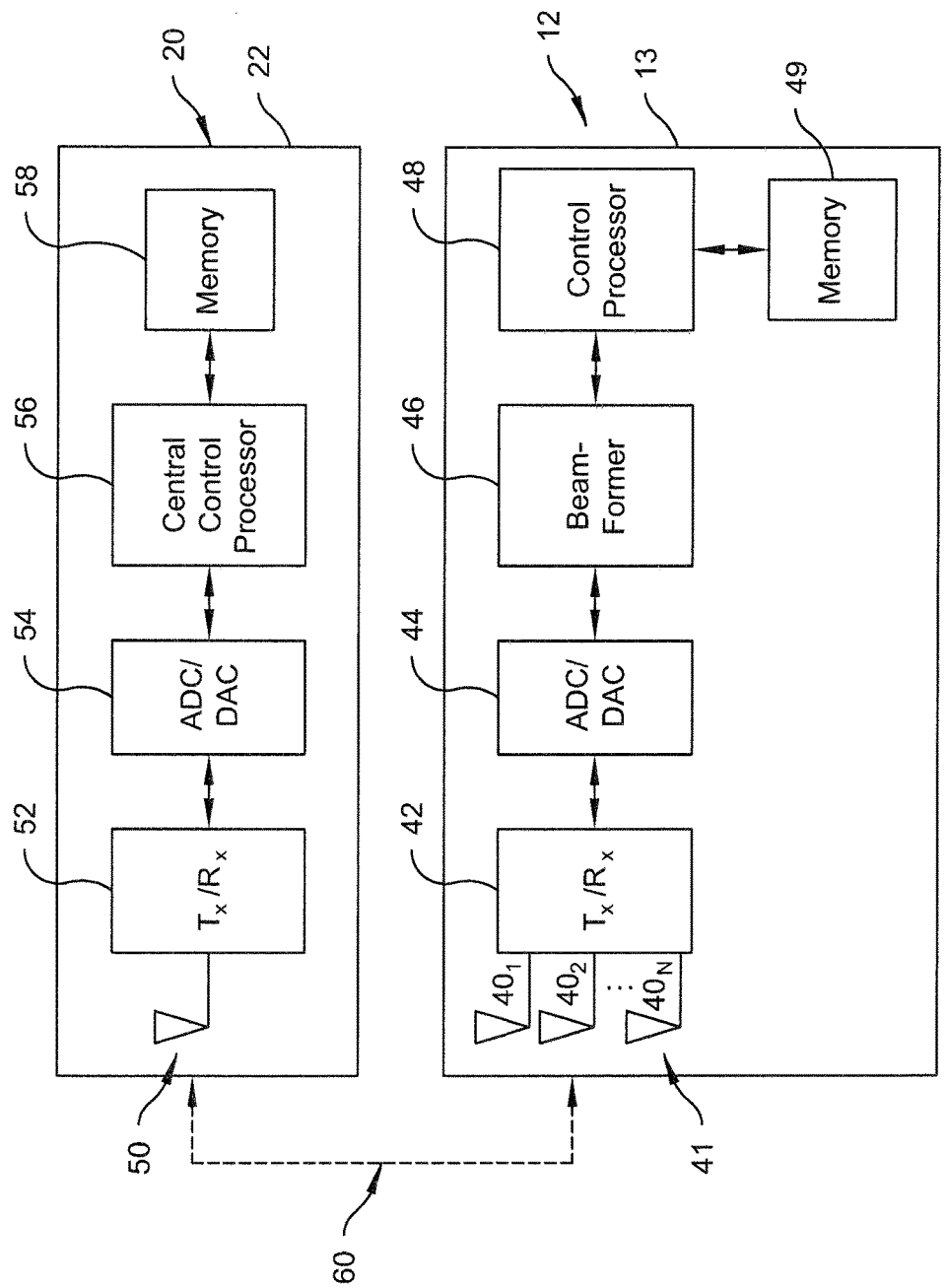
FIG. 2 is a simplified diagram illustrating an exemplary passive radar control system and passive radar receiver according to an embodiment of the present disclosure.

Referring generally to FIG. 2, a high-level system diagram of an exemplary radar system 13 (e.g., of UAV 12 of FIG. 1) and control station 20 useful for describing embodiments of the present disclosure is provided. As set forth above, UAV 12 includes a radar system 13, including a front-end module having one or more transceivers 42 operatively coupled to an antenna 41. As will be understood by one of ordinary skill in the art, transceiver 42 may include various processing components, such as one or more filters, a low-noise amplifier and a down converter. It should also be understood that the illustrated transceiver may be embodied as one or more discrete transmitters and receivers without departing from the scope of the present disclosure. In one embodiment, only a receiver is provided such that antenna array 41 functions only as a receiving device.

Antenna array 41 may be comprised of a digital array of multiple antenna elements $40_1$, $40_2$ ... $40_N$. Each antenna element $40_1$-$40_N$ may be capable of adjusting amplitude and phase during reception operations, as well as during transmission operations, if applicable. At least one analog to digital converter (ADC) and digital to analog converter (DAC) 44 may provided for converting received analog signals to digital form. As will be understood by one of ordinary skill in the art, a beamformer 46 may be provided and controlled via a control processor 48 for selectively adjusting the antenna beampattern, i.e., the amplitude and phase of the received signals at the antenna elements $40_1$, $40_2$ ... $40_N$ during reception operations, and for generating desired beampatterns of signals to be transmitted. Optimized beamforming parameters as well as any operation instructions for performing embodiments of the present disclosure, as well as for the general operation of UAV 12 and any of its systems, may be stored on a memory device 49 and selectively executed via control processor 48. Control processor 48 may also be configured to generate and transmit a plurality of defined EM waveforms from an antenna array 41. A duplexer or switching element (not shown) may also be provided for alternating between transmission and reception channels of transceiver 42.

While not shown for the purpose of brevity, it should be understood that radar system 13 may comprise hardware for processing received radar data, such as sampling the incoming data into range cells or bins, and generating one sample in each range bin for each pulse. Range bin data can then be provided to Doppler filters (not shown) which generate a series of Doppler bins for each range cell. Data from a particular Doppler bin corresponds to a signal from a target or background, at a given range, moving at a particular speed. Once Doppler-filtered, return data is provided to a detection processor operative to, for example, perform a target detection process against a time-averaged background map. These detection processes may include one of more of "greatest of" operations, as well as constant false alarm rate (CFAR) processing by comparing the powers of each range/Doppler cell to a background clutter map.

Still referring to FIG. 2, communications system 21 of, for example, control station 20, is configured to receive radar data gathered by UAV 12 via a communications link 60. For the purpose of simplicity, communications between control station 20 and UAV 12 are illustrated as occurring via antenna array 41 of UAV 12, and antenna 50 of communications system 21. However, it should be understood that separate communication channels, which may include separate transmitters and receivers, which could be wireless or optical, may be implemented without departing from the scope of the present disclosure. Exemplary communications system 21 may comprise a front-end module, including one or more transceivers 52 responsive to a central control processor 56 for generating and transmitting a plurality of defined EM waveforms from antenna 50. As will be understood by one of ordinary skill in the art, transceiver 52 may include various processing components, such as one or more filters, a low-noise amplifier and a down converter. It should also be understood that the illustrated transceiver may be embodied as one or more discrete transmitters and receivers without departing from the scope of the present disclosure.

At least one ADC/DAC 54 may provided for converting received analog signals to digital form, and vice versa. A duplexer or switching element (not shown) may also be provided for alternating between transmission and reception channels of transceiver 52. Radar system data, tracking lists, and instructions for performing the optimization algorithms according to embodiments of the present disclosure, as well as for the general operation of communications system 21, may be stored on a memory device 58 and selectively accessed, executed, or updated via a central control processor 56.

In one embodiment, communication between radar system 13 and control station 20 is achieved via their respect antenna arrays, with optimized transmit and receive beampatterns. In other embodiments, any suitable form of communication link may be utilized without departing from the scope of the present disclosure. For example, free space optical links can be used. In this embodiment, control station 20 may not contain antenna 50, and radar system 13 may not transmit from antenna elements $40_1$, $40_2$ ... $40_N$.

Figure 3:
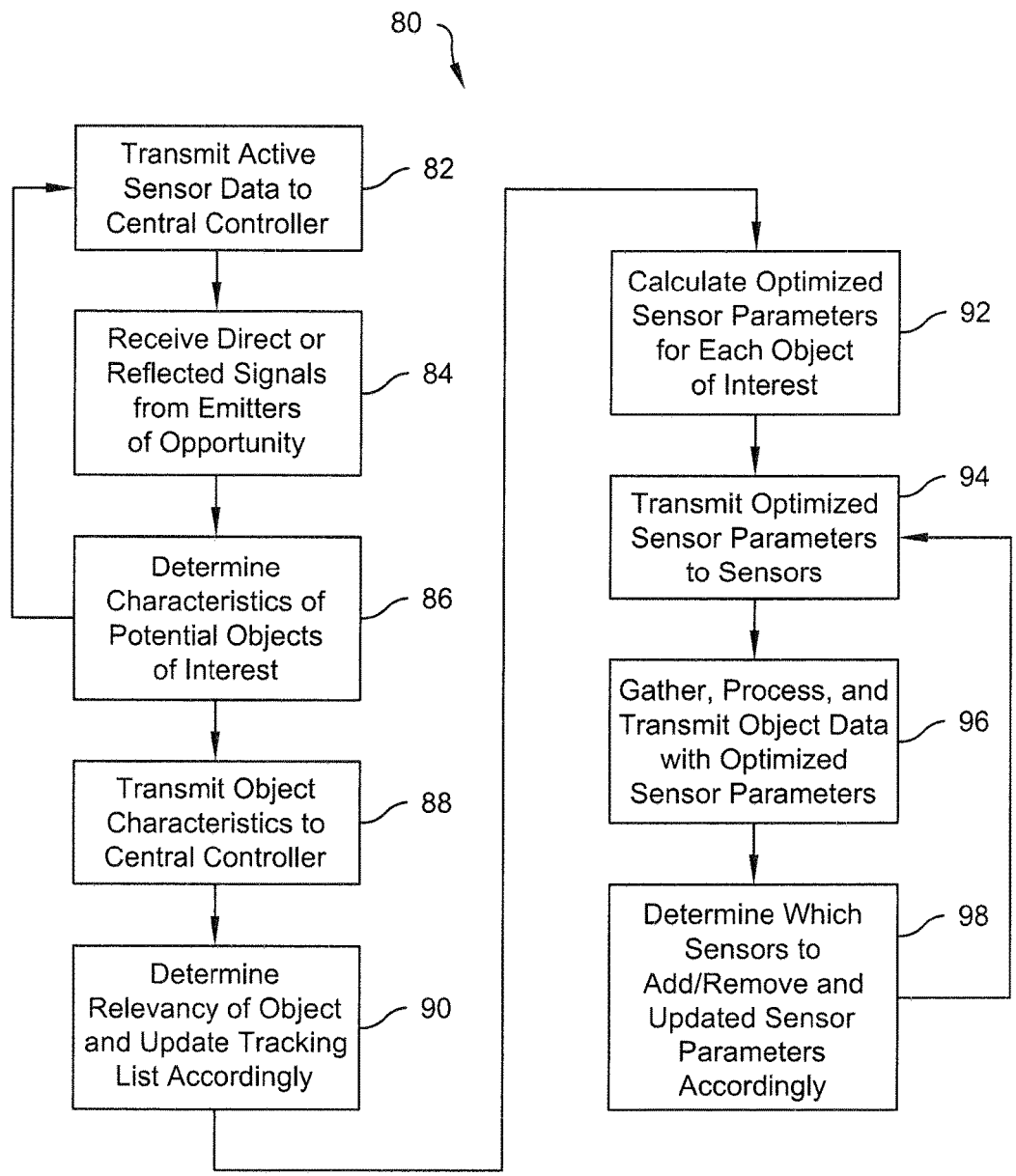
FIG. 3 is a process diagram illustrating steps of an exemplary passive radar optimizing algorithm according to an embodiment of the present disclosure.

Referring generally to FIG. 3, an exemplary optimizing algorithm 80 according to embodiments of the present disclosure will be described in the context of the exemplary scenarios and systems set forth above with respect to FIGS. 1 and 2. Consider deployment of multiple UAVs 12,12',12", each with a wideband (e.g., 88 MHz to 6 GHz) adaptive antenna array 41 for generating respective beampatterns 19,19',19". One or more UAVs 12,12',12" would transmit 82 location and capability information (e.g., bandwidth, antenna size and adaptability, gain) to centralized control station 20. Radar systems 13 of UAVs 12,12',12" receive 84 direct and reflected signals from emitters of opportunity (e.g., FM transmitters 15,16).

From these received signals, radar systems 13 of each UAV 12,12',12" may determine 86 characteristics of an potential targets, for example, approximate range, angle, and Doppler, as well as any time-varying changes in these values, from any reflectors in the environment according to known methods. Each UAV 12,12',12" may process this data for the purpose of identifying potential targets of interest (e.g., with ground moving target indication (GMTI) processing techniques) moving above a given predetermined speed. Information (e.g., range, Doppler, angle, and velocity) relating to any identified potential targets may be transmitted 88 from each UAV 12,12',12" to central controller station 20 via communications link 60.

Central control processor 56 may process this received data to determine 90 the relevancy of any potential targets. For example, control processor 56 may be configured to determine if any of the potential targets are of interest are already being tracked, and/or are the same targets, as well as to determine the approximate location, size and movement of these targets that are to be tracked. This information may be stored in memory in the form of a tracking list, including all identified targets of interest and any radar systems or receivers associated therewith (i.e., located in the vicinity thereof). From this information in combination with the knowledge of all UAV 12,12',12" locations and reception capabilities, control processor 56 is configured to determine an optimum combination of UAVs 12,12',12" receivers (e.g., radar systems 13), and for each sensor the emitters (e.g., the frequencies) to be processed and the beampattern for each frequency in order to obtain the best or required detection/tracking accuracy for each target of interest. This may include the calculation 92 of optimum combination of receiver antenna weighting (e.g., optimum antenna beampatterns, etc.) at each frequency of interest.

Control processor 56 is operative to transmit 94 this information to each sensor of one or more of the UAVs 12,12',12". Using the optimized antenna parameters, UAVs 12,12',12" gather, process, and transmit 96 any data received, with any required compaction, to control station 20. Using, for example, the greedy algorithm, control processor 56 may use the received data to determine 98 whether to add or remove a sensor and/or emitter to be received, along with adjustment of the beampatterns at each frequency in order to maintain optimized tracking. This process may be iterative. It should be understood that tracking may include the use of increasingly higher frequency and bandwidth emitters (which have higher range resolution but generally lower power) with narrower beamwidths at each iteration. The narrower beamwidths provide higher angular resolution along with higher gains to compensate for the lower emitter power. Specifically, with each iteration signals at a sensor identified as increasing overall accuracy the most will be sequentially added to the tracking algorithm. This signal is typically the signal that is the most orthogonal to the previous bistatic path. At each iteration, the beamwidths of the arrays at the sensors are decreased to match the accuracy, i.e., focus the receive beam only on the estimated target location. This process continues until the accuracy is sufficiently high so as to coherently add the signals from the same emitters of opportunity together, to obtain accuracies on the order of wavelengths. The process is continuously updated, adding and removing sensors/signals and adapting the beampatterns to optimize tracking accuracy. The use of multiple sensor platforms at different locations results in the angular arc for one sensor corresponding in part to the range of another sensor, allowing for the high resolution in range due to wide bandwidth to be achieved in all three dimensions, i.e., much higher than the angular resolution.

While the above-described embodiments are described in the context of a centralized controller or control processor, it should be understood that other embodiments are envisioned. For example, distributed processing can also be used, wherein the communication links are provided among the sensor platforms themselves for performing localized optimization according to the methods set forth herein.

Furthermore, embodiments may utilize fixed pattern antenna elements $40_1, 40_2 \ldots 40_N$. However, these elements may comprise reconfigurable antenna elements where the element beampattern can be electronically adjusted as well. In this case, the array beampattern can be optimized using joint adaptation of the element beampattern and the combining weights for each element at each frequency.

Figure 4:
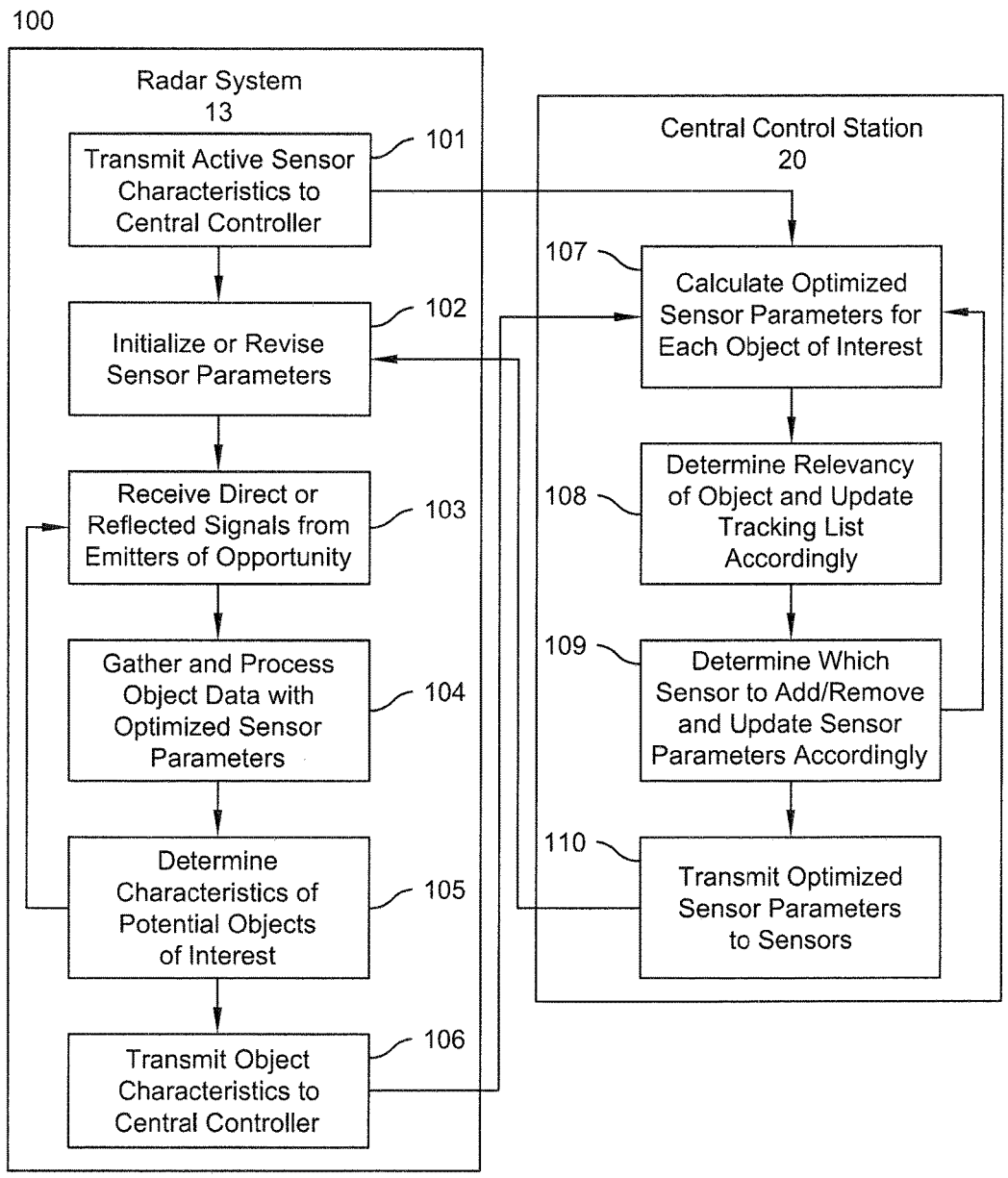
FIG. 4 is a process diagram illustrating steps of an exemplary passive radar optimizing algorithm according to another embodiment of the present disclosure.

FIG. 4 shows another exemplary optimizing algorithm 100 according to embodiments of the present disclosure. In the illustrated embodiment, processing steps and data flow are illustrated between an exemplary central controller (e.g., control station 20) and radar sensors (e.g., radar system 13). A radar system 13 transmits 101 information to control station 20 relating to the location and characteristics of radar system 13 (e.g., characteristics of its sensors/antenna elements). This may include its bandwidth, number and type of antenna elements, processing and data transmission capability, and maneuverability, by way of non-limiting example only. Radar system 13 may be initialized 102 in order to begin functional operation. Direct and reflected signals are received 103 over a wide range of frequencies with a plurality of antenna elements of sensor(s) in radar system 13. The signals from the plurality of antenna elements may be digitized 104, and compressed sensing may be used to find signals of interest over the bandwidth. In one embodiment, stronger signals are then weighted and combined, using adaptive beamforming techniques such as maximal ratio combining, minimum mean square error combining, or beamforming in a given direction (when the location of the emitters of opportunity, target location, and/or the sensor location are known) for both the direct line-of-sight signal from the emitter of opportunity and any reflected signals at their frequencies.

Radar system 13 determines 105 the characteristics of the potential objects of interest and transmits 106 this information to central control station 20. These characteristics may include raw data for processing at the central controller, such as coherently combining signals from multiple sensors for the same emitters of opportunity. Central control station 20 calculates 107 optimized sensor parameters for each object of interest from the sensor characteristics transmitted (101) and the object characteristics transmitted (106). Central control station 20 determines 108 the relevancy of the object and updates a tracking list accordingly. Central control station 20 determines 109 which sensors to add or remove for each target and/or emitter of opportunity, and updates the sensor parameters accordingly. Optimized sensor parameters are transmitted 110 to the sensors. Radar system 13 now revises 102 its parameters based on the information received from central control station 20, and repeats step 103 also using information on the object obtained in the previous step 105.

In more detail, an exemplary process consists of:
1) Choosing the transmitter/receiver combination per identified object that minimizes a figure of merit. This figure of merit could be the probable error volume, which, for example, could be the range and angle accuracy divided by the probability of detection. In this way, there is a tradeoff between range and angle accuracy and probability of detection, as higher range and angle accuracy are typically obtained at a cost of lower probability of detection.
2) Iteratively choosing another transmitter/receiver combination to maximize the reduction in probable error volume.
3) Repeating this process until the desired accuracy is achieved.

In other embodiments, these processes can be abbreviated by a number of means for lessening the number of search iterations required to achieve desired requirements, by:
a) Initially choosing the transmitter/receiver combination with the shortest path.
b) Initially adding the transmitter/receiver combination with the largest probability of detection.
c) Discounting any transmitter/receiver combination with a probability of detection below a threshold.

In the scenario where the transmitters and receivers can be enumerated by type (e.g., 5 of type A, 6 of type B), other efficiencies can be achieved by, for example:
1) Iterating by type, based on range accuracy (most accurate first).
2) Sorting transmitter/receiver combinations based on path length within a type.
3) Repeating initialization algorithm (a-c), but discontinuing the search within a type when the probability of detection becomes too small.

The embodiments are provided by way of example only, and other embodiments for implementing the methods described herein may be contemplated by one of skill in the pertinent art without departing from the intended scope of this disclosure. For example, systems, including the control processor, may include memory containing data, which may include instructions, the instructions, when executed by a processor or multiple processors, cause the steps of a method for performing the signal processing and system control set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method comprising:
   receiving, with at least one controller, radar receiver characteristics for a plurality of radar receivers occupying an area of interest;
   receiving, at the at least one controller, data indicative of direct or reflected radar return signals received by the plurality of radar receivers;
   identifying objects of interest from the received data;
   calculating optimized radar receiver parameters for the plurality of radar receivers for each identified object of interest; and
   transmitting the optimized receiver parameters to the plurality of radar receivers.

2. The method of claim 1, further comprising the steps of:
   receiving updated radar return data from the plurality of radar receivers using the optimized parameters; and
   updating the optimized parameters according to the updated received radar return data.

3. The method of claim 2, further comprising the step of generating a tracking list of identified objects of interest and radar receivers associated with each identified object.

4. The method of claim 3, further comprising, in response to receiving updated radar return data, the steps of:
   identifying objects of interest from the received updated radar return data; and
   updating the tracking list of identified objects of interest and radar receivers associated with each identified object.

5. The method of claim 4, wherein the step of updating the tracking list includes at least one of adding or removing identified objects of interest or associated radar receivers from the tracking list.

6. The method of claim 1, wherein plurality of radar receivers comprise adaptive antenna arrays.

7. The method of claim 6, wherein the optimized receiver parameters include optimized parameters for altering a beampattern of the adaptive antenna arrays.

8. The method of claim 1, wherein the radar receiver characteristics include the location of the radar receiver.

9. A control system for a plurality of radar receivers, the system comprising:
   a communications system including a transmitter and a receiver for transmitting data to and receiving data from the plurality of radar receivers;
   one or more computer processors operatively connected to the communications system; and
   a memory in communication with the one or more processors and storing program instructions, the one or more processors operative with the program instructions to:
     with the receiver, receive radar receiver characteristics for the plurality of radar receivers occupying an area of interest;
     with the receiver, receive data indicative of direct or reflected radar return signals received by the plurality of radar receivers;
     identify objects of interest from the received data;
     calculate optimized radar receiver parameters for the plurality of radar receivers for each identified object of interest; and
     with the transmitter, transmit the optimized receiver parameters to the plurality of radar receivers.

10. The system of claim 9, wherein the one or more processors is further operative with the program instructions to:
    receive updated radar return data from the plurality of radar receivers using the optimized parameters; and
    update the optimized parameters according to the updated received radar return data.

11. The system of claim 10, wherein the one or more processors is further operative with the program instructions to generate a tracking list of identified objects of interest and radar receivers associated with each identified object.

12. The system of claim 11, wherein the one or more processors is further operative with the program instructions to, in response to receiving updated radar return data:
    identify objects of interest from the received updated radar return data; and
    update the tracking list of identified objects of interest and radar receivers associated with each identified object.

13. The system of claim 12, wherein the step of updating the tracking list includes at least one of adding or removing identified objects of interest or associated radar receivers from the tracking list.

14. The system of claim 9, wherein plurality of radar receivers comprise adaptive antenna arrays.

15. The system of claim 14, wherein the optimized receiver parameters include optimized parameters for altering a beampattern of the adaptive antenna arrays.

16. The system of claim 9, wherein the radar receiver characteristics include the location of the radar receiver.

* * * * *